Patented July 11, 1939

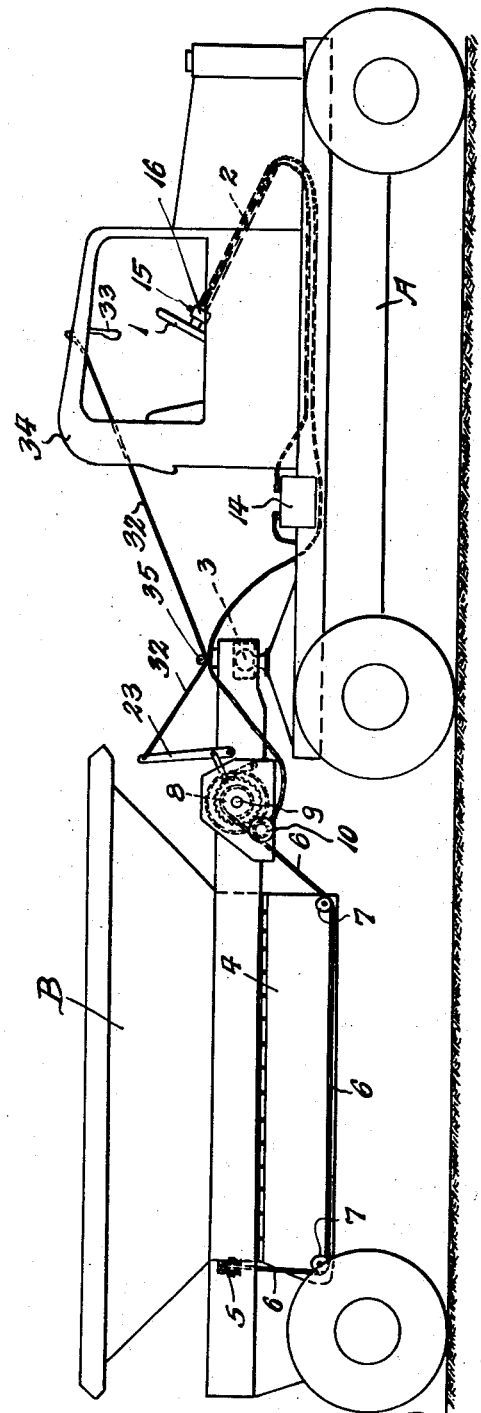

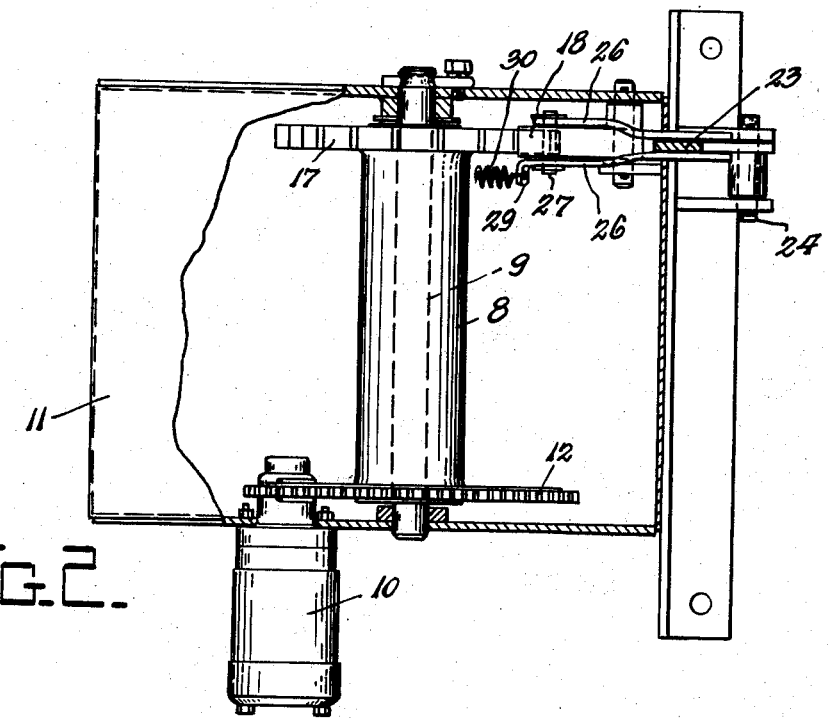
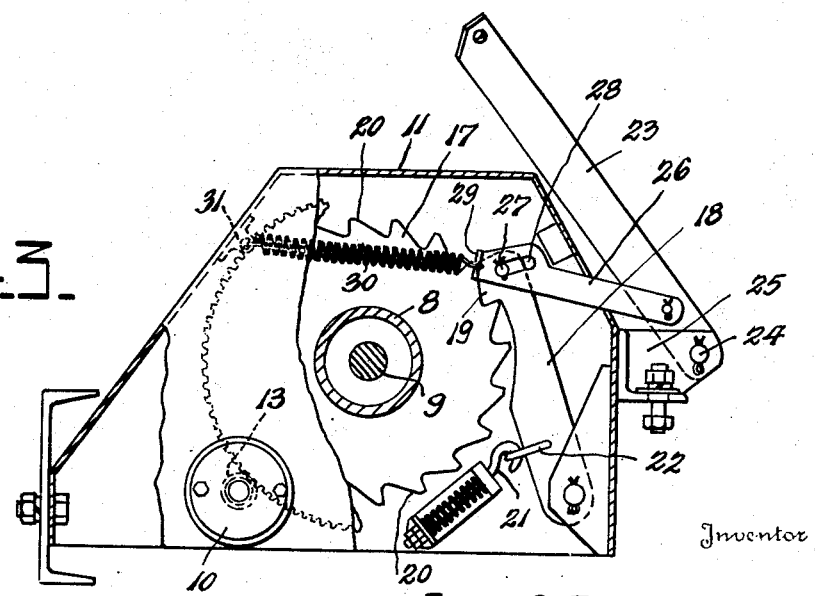

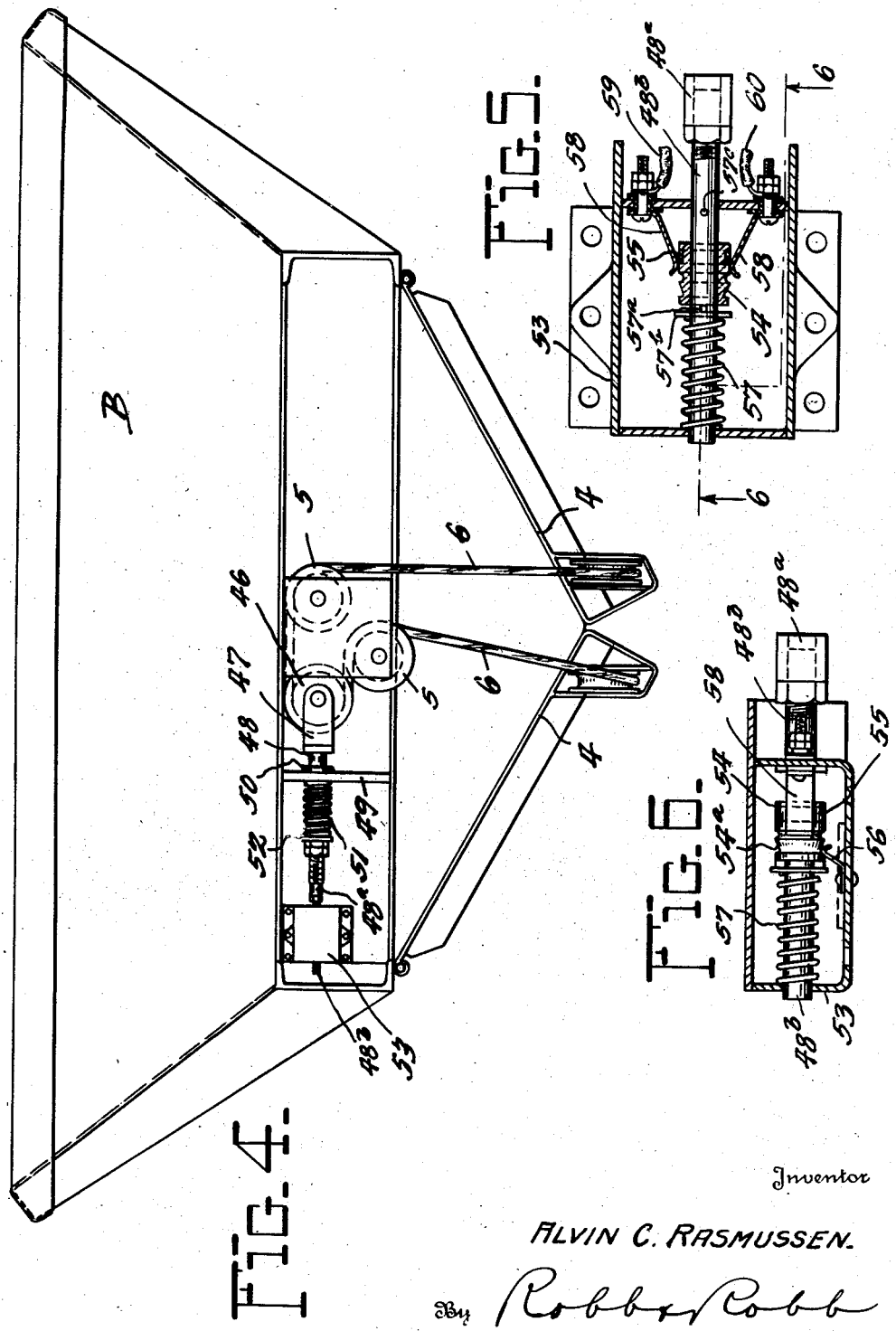

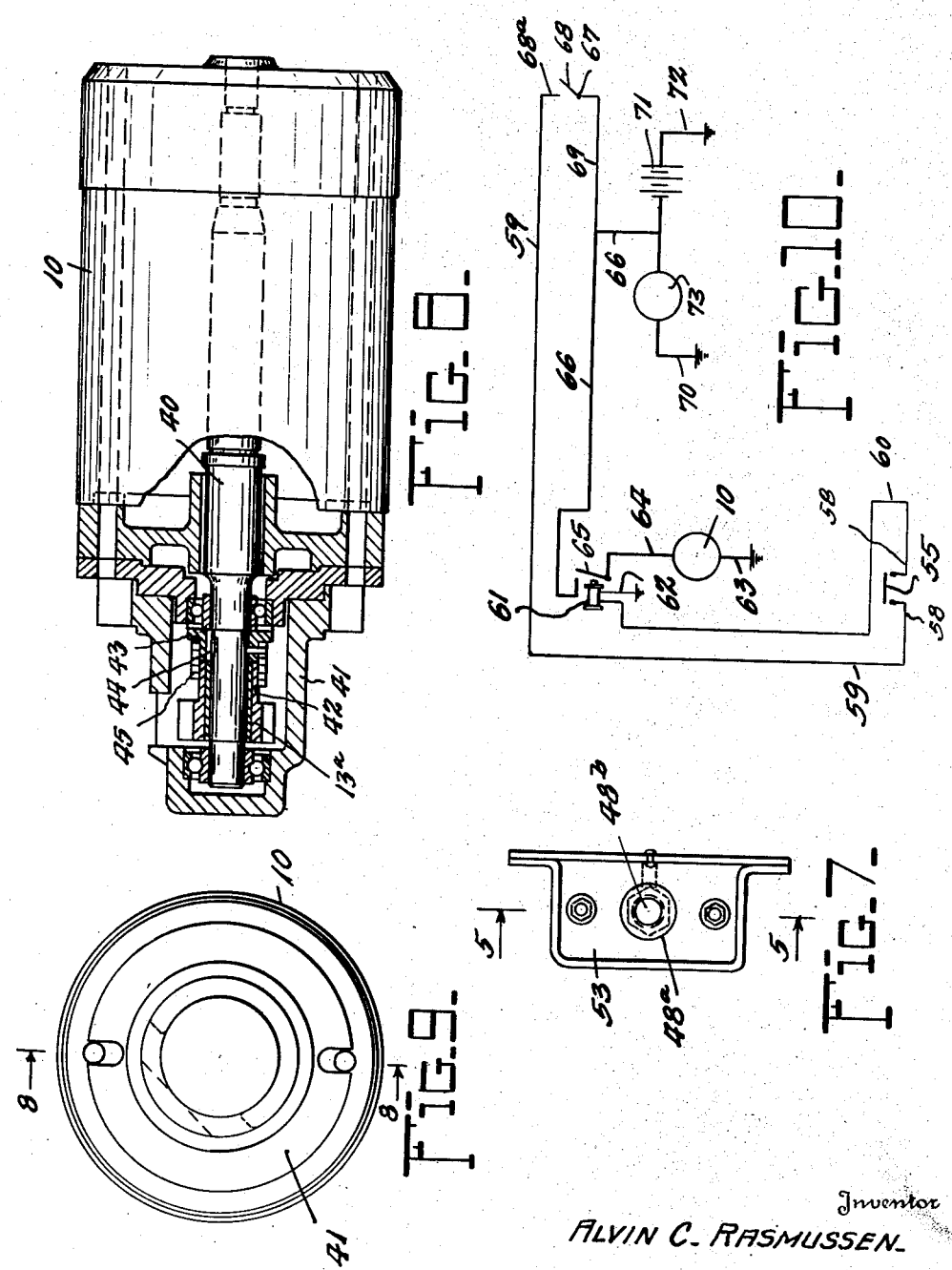

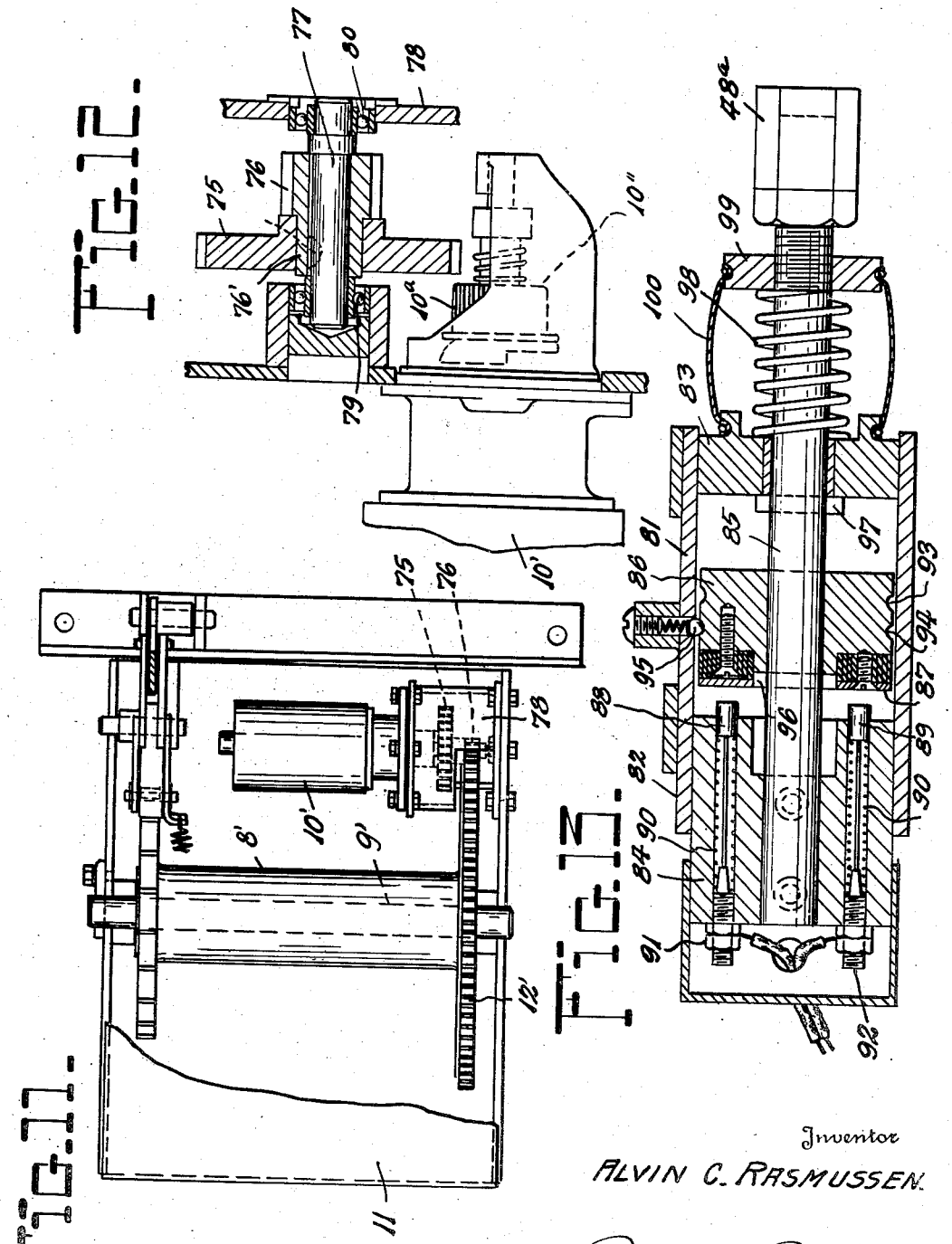

2,165,507

UNITED STATES PATENT OFFICE 2,165,507

TRACTOR-TRAILER DUMPING VEHICLE

Alvin C. Rasmussen, Indianapolis, Ind., assignor to Insley Manufacturing Corporation, Indianapolis, Ind., a corporation Application January 7, 1938, Serial No. 183,915

14 Claims. (Cl. 298—35)

This invention appertains to a type of dirt moving vehicle very largely in general use today and comprising a two-wheel trailer vehicle supported at its front end upon the rear of a tractor or pulling vehicle, the trailer vehicle being equipped with dumping doors for maintaining the body in dirt receiving condition and operable for the dumping of the dirt at the site where it is to be deposited.

In constructions of the dumping mechanism for the dumping doors of trailer vehicles of this type, more or less complicated winding mechanisms have been utilized for the winding up of the dump door closing cables in order to effect the door closing action of the vehicle.

The present invention embodies relatively simple means for closing the doors of the trailer dumping body, said means availing of the heretofore used closing cables trained over pulleys connected with the face of the said body and with the doors themselves, which cables are operated by a small electric motor unit mounted upon the trailer chassis and supplied with current from the starter battery of the tractor vehicle, or any suitable similar source of electric energy.

This invention additionally involves novel automatic means to discontinue operation of the motor driving unit when the doors of the dumping body are closed; also novel means to prevent sudden stopping of the rotation of the rotor of the electric motor at the end of the door opening operation.

The invention primarily involves the employment of the electric operated unit above referred to in connection with the winding shaft for the door closing cables, or ropes, or chains, as the case may be, said winding shaft being operated in one direction when released by the weight of the doors and load of dirt thereon as the doors open.

Special locking means for the winding shaft, including a ratchet pawl or dog, forms a specific feature of novelty of the invention, said locking means holding the winding shaft in a locked position after the same has been operated to restore the dumping doors of the trailer body to closed condition upon the actuation of the electric motor driving means connected with said shaft.

In the drawings:

Figure 1 is a side view of a tractor-trailer combination vehicle embodying the door closing and opening mechanism of the invention.

Figure 2 is a top plan view showing more particularly the mounting of the electric motor, its driving connections with the winding shaft of the door closing means, and the ratchet wheel and dog mechanism coacting with said winding shaft.

Figure 3 is a side view, partially in section, of certain of the parts shown in Figure 2, with the casing broken away to facilitate the illustration, and some of the parts themselves broken away or omitted for a similar purpose.

Figure 4 is a rear view of the trailer dumping body showing the method of training the door closing cables around the guide and supporting sheaves therefor and the connection of said cable means with an idler sheave arranged to operate a special switch controlling the operation of the electric circuit means according to a preferred adaptation of the latter.

Figure 5 is a sectional view through the casing, taken on the line 5—5 of Figure 7, of the switch seen in Figure 4, bringing out the interior details.

Figure 6 is a sectional view of the switch box or casing and adjacent parts as shown in Figure 5, but comprising a section taken upon the approximate line 6—6 of Figure 5, with the switch operating rod in full lines.

Figure 7 is an end view of the switch box or casing, looking toward the wire terminal attaching means.

Figure 8 is an elevation partly broken away and shown in section, taken about on the line 8—8 of Figure 9, illustrating parts of the door closing motor and particularly the clutch means intermediate the driving pinion thereof and the armature shaft, the armature windings of the shaft omitted.

Figure 9 is an end view of the motor housing and pinion housing attached thereto, or an end view of the unit shown in Figure 8.

Figure 10 is a diagrammatic view of the circuit arrangements employed in conjunction with the devices illustrated particularly in Figures 4 to 9 inclusive.

Figure 11 is a view similar to Figure 2, showing a modified structure of the present invention.

Figure 12 is a detail view of certain parts generally shown in Figure 11.

Figure 13 illustrates a modified switch construction.

Describing the manner of application of the door controlling mechanism of the invention as disclosed in the drawings, A denotes the tractor vehicle used in conjunction with the trailer dumping vehicle B. Generally speaking, the vehicles A and B may be said to be of conventional types, the tractor vehicle A operating under its own power, as usual, being equipped with the steering wheel 1 on the steering column shown in dotted lines at 2 and having at its rear end the fifth wheel connection 3 for supporting the front end of the trailer vehicle B and providing the draft means intermediate the two. The trailer vehicle B is equipped with the doors 4, which are the usual bottom swinging doors movable downwardly to open and upwardly in order to close.

At the rear of the body of the vehicle B are located guiding and supporting sheaves 5 over which is trained a rope or cable means 6 which passes also around sheaves or pulleys 7 that are attached to the doors 4 near the swinging edge portions of the latter. The cable means 6 after passing over and around the pulleys 7 is connected with the drum 8 carried by the winding shaft 9 supported upon the chassis of the vehicle B near the front portion of the latter. A turning or winding movement of the shaft 9 and its drum 8 in a clockwise direction will exert the necessary tension on the cable means 6 to raise the doors 4 and close them as usual. Ratchet means cooperating with the parts 8 and 9 are adapted to hold the doors 4 closed through the cable means, and when released will permit the doors to swing downwardly and open in order to effect the dumping of the vehicle B in the customary manner.

The turning movement of the parts 8 and 9 for compelling the closing of the doors 4 is effected by means of a small electric motor 10 mounted upon the casing 11 which is arranged to enclose the driving means between the said motor 10 and the shaft 9, as well as the ratchet mechanism previously referred to. For connecting the motor 10 with the shaft 9 the latter carries fixed thereto a relatively large gear 12 and this gear meshes with the driving pinion shown in dotted lines in Figure 3 and designated 13, said pinion being directly carried by the motor shaft.

Current is supplied to the motor 10 by means of suitable wiring leading from the starting battery 14 or similar source of power on the tractor vehicle A, to the connecting terminals of the motor. The closing and opening of the circuit, including said circuit wires and motor 10, is under the control of a push button 15 forming a part of an electric switch 16 mounted on the steering wheel column 2 of the tractor vehicle.

Thus it is to be seen that the operation of the winding shaft 9 and its drum 8 for the closing of the doors is directly under the control of the driver of the tractor vehicle A while sitting at the driving station thereof.

On the winding shaft 9, preferably at the end opposite that having the gear 12, is located the ratchet or toothed wheel 17 with which coacts the locking dog 18, the tooth or nose 19 of which is adapted to engage the teeth 20 of said wheel 17. The dog 18 is arranged in a position slightly inclined from the vertical, and a spring actuated hook 21 is attached to a loop 22 on said dog for the purpose of pulling the dog into engagement with the teeth 20. For operating the dog 18 in order to disengage the same from the toothed wheel 17, thereby to release the shaft 9 and the drum 8 for the unwinding movement of the cable means 6 to enable the dump doors 4 to open, there is employed the trip lever 23. This lever 23 is pivoted at 24 to a bracket 25 and is connected by a double link 26 with a crosspin 27 which in turn passes through the upper end of the dog 18 near its nose portion. To provide a certain amount of play in the connection between the link means 26 and the dog 18, the link means 26 is formed with slots 28 through which the pin 27 passes. One side of the double link structure 26 is formed with a lateral lug 29, and a spring 30 connects this lug to a fixed bracket 31 attached to the inner side of the casing 11.

The trip lever 23 is connected by a flexible member or cable 32 to a handle 33 in the cab 34 of the tractor vehicle A, said handle located adjacent to the driver's station of the cab so that it may be grasped for a pull upon the cable 32 exerted in the forward direction, whereby to effect a rocking of the trip lever 23 to release the winding means for the cable parts 6.

Taking into consideration the relative movement of the tractor vehicle A and the dumping vehicle B, both vertically and horizontally incident to the use of the fifth wheel or universal connection 3 therebetween, it is contemplated to employ pulley guide means 35 located at the vertical axis of the connection 3, beneath which guide means the cable 32 passes. In this way the cable 32 is operative under all conditions of the angular relations which may be assumed between the vehicle members A and B, both in respect to the horizontal and the vertical.

The operation of the invention may now be set forth.

Assuming the parts to be in the positions illustrated in Figure 1, the dumping operation of the vehicle B has been completed by the opening of the doors 4. The driver in the cab 34 presses upon the push-button 15 and closes the circuit to the motor 10. The driving of the motor 10 in this way transmits clockwise movement to the winding shaft 9 and its drum 8, winding up the cable means 6 and causing the doors 4 to close. As the shaft 9 rotates clockwise, the teeth 20 of the ratchet wheel 17 freely engage and push forwardly the dog 18 without any movement of the link 26 and lever 23 by reason of the pin and slot connection between the parts 18 and 26 previously referred to and designated 27, 28. The load of moving the parts 26 and 23, therefore, is not placed upon the motor 10, and as the dog 18 vibrates during said winding up movement of the cable means on the drum 8 the nose 19 of the dog freely escapes over the teeth in the customary manner of ratchet mechanism operation. Normally, the spring actuated hook 21 pulls the dog 18 so that when it lies at rest with its nose engaged with a tooth of the wheel 17, the pin 27 is at the rear ends of the slots 28 of the double link member 26. Thus it is that any pull upon the cable 32 will be immediately transmitted to the dog 18.

Assuming now that the parts are in the position of Figure 3 and the doors 4 have been closed, it will be apparent that the operator by grasping the handle 33 and pulling on the cable 32 can shift the dog 18 forwardly to disengage its nose 19 from the tooth of the wheel 17 with which it cooperates, and in this way the parts 17, 8, and 9 are released and the cable means 6 adapted to unwind from the drum 8 so that the weight of the doors 4 and the dirt or material, whatever it may be, in the dirt carrying vehicle B, may be deposited at a desired point or site for its reception.

While the motor and circuit arrangements as hereinbefore described may be utilized for the purposes of the invention, it is contemplated to avail of features illustrated in Figures 4 to 10 to deal with problems arising in the operation of mechanism such as embodied in this invention. In order to prevent the weight of the doors and load imposed thereon, as the doors open to dump, from causing the motor 10 to be revolved in a reverse direction at high speed as the cable on the drum 8 is unwound, causing relatively high speed action thereof, motor means of the type illustrated in Figures 8 and 9 are preferably resorted to. The armature shaft of the motor, see Figures 8 and 9, is designated 40 and carries thereon, in the pinion housing 41, the pinion 13a, similar to that previously referred to. Said pinion 13a is loose upon the shaft 40 in the modified construction now being described and has a sleeve extension 42 adjacent to a clutch member 43 also carried by the shaft 40 but keyed thereto as shown at 44.

Interlocked with the clutch member 43 is a helical clutch spring 45 of a known type adapted, when the power is applied to the motor shaft 40, to cause the closing of the doors 4, to clutchingly engage the sleeve 42 and thereby connect the shaft 40 with the pinion 13a to drive said pinion and the gear 12 coacting therewith for wind-up operation of the drum 8.

However, on the unwinding operation of the drum 8 as previously referred to, the pinion 13a is free to turn in the reverse direction without actuating the shaft 40 in such direction, by reason of the fact that the helical clutch spring 45 will open up and slip on the clutch member or hub 43. The foregoing clutch feature is known practice today and need not be further described.

A second problem dealt with according to the present invention is that of automatically effecting a discontinuance of the driving action of the motor 10 when the doors 4 close or reach the practical limit of their closing movement.

For the last described purpose it is noted that the cables 6 at the rear of the dumping body B pass not only over the supporting and guide sheaves 5 such as previously referred to, but likewise operate around an idler sheave 46. The idler sheave 46 is mounted in a yoke 47 connected with an actuating and release rod 48 that passes through a partition 49 on the rear frame portion of the body B. A fixed collar 50 limits the direction of movement of the parts 46, 47, and 48 to the left, as seen in Figure 4, under the influence of expanding movement of the coil spring 51 which encircles the rod 48 and bears at its left end, see Figure 4, on an adjustable collar 52 carried by said rod 48.

The rod 48 has its end abutting with an adjustable sleeve-like abutment 48a of a switch rod 48b. The rod 48b enters the switch box or casing 53 and is guided in its movement by openings in the ends of said casing. Said rod 48b carries within the casing 53 a sleeve 54 slidably mounted on said rod and carrying an annular contact 55. The sleeve 54 is formed with a detent groove 54a in which a stop spring 56 may engage, see Figure 6.

A spring 57 between the switch box 53 and pin 57a and washer 57b coacts with the rod 48b and pin 57a to move the switch sleeve to the right, as seen in Figure 5. This movement of the switch sleeve 54 takes place when the actuating and release rod 48 is shifted under the tension of the cable means 6 working around the sheave 46 after the doors 4 have reached their closed positions, as will be later described.

The motor 10 is included in an electric circuit comprising the ground connection 63 leading from one terminal of the motor, a conductor 64 leading from the other terminal of said motor, the solenoid-operated switch 65, and the conductor 66 leading from the switch 65 to one of the terminals of the generator 73 of the tractor vehicle A, and battery 71 grounded with its terminals at 70 and 72, respectively.

For coaction with the contact ring or annulus 5 of the switch sleeve 54 are the two terminal contact members 58 which are connected by means of conductors 59 and 60 with one terminal 68a of the push button switch 68 located in the cab, and one terminal of the solenoid 61, the other terminal of the solenoid being grounded as shown at 62. The terminal 67 of the push button switch 68 is connected by conductor 69 to conductor 66 leading to the battery 71 and generator 73, and ground connections 72 and 70 of the same.

When the motor of the tractor vehicle A is not running, current will be supplied to the circuit means above described from the battery 71, said current of the battery being replenished from the generator 73. Of course, when the motor of the vehicle A is running, the current may come directly from the generator as well as the battery 71.

With the described circuits, switches, and motor generator and battery parts in view, the operation of automatically discontinuing the closing operation of the doors 4 may be set forth. It will be assumed that the doors 4 are closed as shown in Figure 4, under which conditions the cable means 6 will have been tensioned to exert a pull on the sheave 46 carrying the axis of said sheave to the right, as seen in Figure 4, and shifting the actuating and release rod 48 in the same direction. This operation relieves the pressure of the rod 48 and spring means 51 upon the adjustable abutment 48a and permits the spring 57 to move the switch sleeve 54 sufficiently to the right as seen in Figures 5 and 6 to disconnect the ring contact 55 from the contacts 58 of the solenoid circuit. Under these conditions the solenoid 61 remains de-energized because of the opening of the switch means 54—58 and the motor 10 is idle because the switch 65 is also open and remains in such condition as long as the doors 4 are closed.

It is obvious that when the lever 23 is operated by the pull handle 33 and the doors 4 thus released by disengagement of the dog 18 from the ratchet wheel 17, the doors 4 will drop to their open positions and the tension on the cable means 6 will thus be relieved, permitting the spring 51 to thereby shift the actuating rod 48 to the left, as seen in Figures 4 to 6. This operation effects movement of the switch rod 48b to the left and connects the contacts 55 and 58 to thereby condition the solenoid circuit including the solenoid 61, for operation.

After the conditioning of the solenoid 61 for operation in the manner above described, the switch 65 in the motor circuit including the conductors 64 and 66 may now be closed by the push button or equivalent type of switch 68 in the cab of the driver, which switch corresponds to the type of switch 15 previously described.

The next operation involves the closing of the doors 4 and the switches and circuits have, by the automatic actions above described, been prepared to enable the operator to effect closing of said doors by causing operation of the motor 10. The operator now closes the switch 68, the load of material in the body B having been dumped by opening its doors and immediately the motor circuit, previously partly closed by the switch 55, 58 is completely closed, causing energization of solenoid 61, which in turn effects closing of switch 65 and the electric circuit for the motor 10, to thereby supply current to the motor which starts the operation of the pinion 13a through the action of the clutch spring 45 and winds up the cables 6 by the turning of the drum 8.

When the doors, by the upward pull of the cable means 6, reach their closed positions, they can move no farther and the additional pull on the cable means 6 exerts a pull to the right on the idler sheave 46 and a corresponding pull on the actuating and release rod 48. The pressure of this rod 48 through the spring 51 is now relieved and this enables the spring 57 to force the rod 48b, pin 57a and switch sleeve or member 54 to substantially the position of Figure 5, opening the switch comprising the parts 55 and 58. As soon as the door controlled switch means 55—58 is opened, the solenoid 61 is de-energized and the solenoid operated switch 65 is released, thereby automatically opening the motor circuit and discontinuing at once the operation of the motor which has previously been tensioning the winding of the cable means 6 on the drum 8. The closing of the doors in the above manner has thus automatically discontinued the operation of the motor 10.

It is notable that the switch sleeve 54 is slidably mounted with respect to the switch rod 48b between pins 57a and 57c which effect shifting of the switch sleeve with some delay in regard to the movement of the switch rod 48b. This permits of a slight overrun in the hoisting of the doors 4 to assure a complete closing of the same. When the tension in the cables 6 is eased off, or should the latch 18 cooperating with the winding drum 8 through the ratchet 17 not engage immediately, the delay in the operation of the sleeve permits the drum 8 to unwind a slight amount until a tooth of the ratchet wheel 17 does engage and prevents accidental closing of switch 55, 58 and switch 65. It will therefore be seen that the automatic switch means 55, 58 of the primary circuit prevent an actuation of the secondary or motor circuit beyond the necessary time to effect closing of the doors even though the push button switch is held in closed position.

In Figures 11 and 12 there is shown a modified structure of the present invention in which the motor 10' is mounted within the casing 11, thereby to protect the same against damage. In this construction the motor 10' is provided with gear housing containing a train of reduction gears 75 and 76. The gear 76 is in constant mesh with the large gear 12' carried by the drum shaft 9' which are of the same construction as shown in Figure 2. By the employment of the reduction gear referred to above, the lifting capacity of the electric motor is considerably increased and an overloading of the motor is prevented. The motor 10' may be of the construction as shown in Figure 8, and may be provided with a spring clutch and pinion, as illustrated in this figure, the latter being in constant mesh with the gear 75; or the motor 10' may be provided with a standard Bendix drive as illustrated at 10'' in Figure 12. If the latter drive is availed of, gear 75 is in mesh with the gear 10a of the Bendix drive.

In view of the fact that the Bendix drive referred to above is well known in the art, a specific description of the same is not deemed necessary. However, it must be noted that upon operation of the motor, gear 10a will engage gear 75 and rotation will be transferred over gear 76 to the large gear 12' for operation of the hoist drum 8' to effect closing of the doors. Upon discontinuation of the operation of the motor, gear 10a of the Bendix drive disengages from gear 75 and therefore upon release of the locking instrumentalities, above referred to in regard to Figure 2, to cause opening of the doors, the rotation of gears 12', 76, and 75 will not be transferred to the gear 10a of the Bendix drive, and rotation of the rotor of the motor 10' in a reverse direction is eliminated.

The gears 75 and 76 are secured to each other by shrinking gear 75 upon the hub portion 76' of gear 76, which in turn is keyed to shaft 77 by a Woodruff key, or the like. The shaft 77 is rotatably mounted within the gear housing 78 by means of roller bearings 79 and 80, as shown in Figure 12.

The modified construction of switch unit 81 as shown in Figure 13 is somewhat similar to the switch unit as illustrated in Figure 6. However, it differentiates from the same in that it forms a completely closed unit for protection of its working parts against accumulation of foreign matter and moisture, which may interfere with the proper functioning of the same.

The switch unit 81 comprises a casing 82 provided with bearing members 83 and 84 for shiftably supporting switch rod 85. Mounted between members 83 and 84 is a sleeve 86 provided with an insulated annular contact 87 cooperating with the contacts 88 and 89 on the bearing member 84, the latter being made from insulating material. These latter contacts are resiliently mounted by means of coil springs 90 and are conductively connected with the terminals 91 and 92.

The sleeve member 86 is provided with two annular grooves 93 and 94 cooperating with a spring pressed ball member 95 for maintaining the sleeve in operative or inoperative positions. The sleeve member 86 is shifted to open or close the electric circuit of the solenoid by means of rod 85 and pins 96 and 97. Rod 85 is normally held in the position shown in Figure 13 by means of spring 98 arranged between the bearing member 83 and abutment member 99 secured to rod 85 in any convenient manner. A flexible closure member 100 may be provided for protection of spring 98.

The operation of switch unit is similar to that described in regard to Figures 5 and 6 and need not be repeated, therefore.

Having thus described my invention, what I claim as new and desired to secure by Letters Patent of the United States, is—

1. In a tractor-trailer combination dirt hauling vehicle, a tractor vehicle, a trailer vehicle connected therewith and comprising a dumping body having dumping doors, cable means connected to the dumping doors for closing same and releasable to enable them to open, winding mechanism for the cable means carried by the trailer for closing the doors, a motor carried by the trailer and geared to the said winding mechanism for operation thereof, locking mechanism for the winding mechanism to hold same locked and thereby hold the doors closed, the locking mechanism comprising a ratchet wheel, a dog to engage the ratchet wheel and lock same from movement, a trip lever, a linkage means connecting the trip lever with said dog and comprising a pin and slot connection with the dog, spring means normally holding the dog engaged with the ratchet wheel independently of the action of the trip lever and linkage means, and spring means connected with the linkage means to hold the same and the trip lever in a predetermined operative position relatively to the dog.

2. A tractor-trailer combination dirt hauling vehicle as claimed in claim 1, combined with a trip cable leading from the trip lever to the tractor vehicle and operable to shift the trip lever to release the dog from the ratchet wheel and permit the opening of the doors of the dump body, an axis connection between the trailer vehicle and the tractor vehicle, and guide means for said cable connected to the trip lever arranged at the axis provided between the tractor and the trailer vehicles.

3. In a dumping vehicle comprising a dump body having dumping doors, means for causing discharge action of the dumping doors by opening same, a motor for effecting closing operation of the dumping doors, automatic means for conditioning the motor to be operated when the dump doors have been actuated to assume their discharging positions, and manual means to initiate operation of the motor when same has been conditioned for operation by the above mentioned means.

4. In a dumping vehicle, in combination, a dumping body having dumping doors, cable winding mechanism, cables connected to said winding mechanism for closing the doors, a motor to operate the winding mechanism, means to condition the motor to be operated incident to opening of the dumping doors, instrumentalities to discontinue the operation of the motor when the dumping doors are closed, and a manual control device to cause operation of the motor after it has been conditioned to operate incident to the opening of the dumping doors.

5. In a dumping vehicle, a dumping body having dumping doors, winding mechanism for closing said doors and releasable to enable them to be opened, a motor to operate the winding mechanism, means to prevent operation of the motor while the doors are closed, instrumentalities to condition the motor to be actuated when the doors are opened, and a manual device for effecting operation of the motor after it has been conditioned to be operated incident to the opening of the doors.

6. A dumping vehicle as claimed in claim 5, wherein the winding mechanism comprises cables connected to the doors to close them, and means for operating the instrumentalities mentioned adapted to be actuated by abnormal tension placed upon the cables incident to stoppage of movement of the doors at their closed position.

7. A dumping vehicle as claimed in claim 5, wherein the winding mechanism comprises cables connected to the doors to close them, means for operating the instrumentalities mentioned adapted to be actuated by abnormal tension placed upon the cables incident to stoppage of movement of the doors at their closed position, and clutch means connecting the motor with the winding mechanism whereby to operate the winding mechanism from the motor but releasable to prevent actuation of the motor from the winding mechanism.

8. In a dumping vehicle, in combination, a dumping body having dumping doors, cable winding means connected to the doors for closing same, means for releasing the winding means to enable the doors to open, a motor for operating the winding means to effect closing of the doors, and control means operable incident to abnormal tension on the cable means when the doors are closed to prevent operation of said motor.

9. In a dumping vehicle, in combination, a dumping body having dumping doors, cable winding means connected to the doors for closing same, means for releasing the winding means to enable the doors to open, a motor for operating the winding means to effect closing of the doors, control means operable incident to abnormal tension on the cable means when the doors are closed to prevent operation of said motor, instrumentalities to condition the motor for operation when the doors are opened, and a control device to initiate actuation of the motor when said conditioning instrumentalities have been operated upon opening of the doors.

10. In a dumping vehicle, in combination, a dumping body having door discharge means, a motor, mechanism operated by the motor for closing the doors after they have been opened, control means for initiating operation of the motor, and instrumentalities for preventing operation of the motor when the doors are released for opening, comprising a clutch mechanism operable to enable actuation of the doors by the motor for closing but prevent actuation of the motor by the doors when they are opened.

11. In a tractor-trailer combination dirt hauling vehicle, a tractor vehicle, a trailer vehicle connected therewith and comprising a dumping body having dumping doors, cable means connected to the dumping doors for closing same and releasable to enable them to open, winding mechanism for the cable means carried by the trailer for closing the doors, a casing for said winding mechanism, a motor within said casing, and geared to the said winding mechanism for operation thereof, locking mechanism for the winding mechanism to hold same locked and thereby hold the doors closed, and instrumentalities on the tractor vehicle for controlling therefrom the operation of the motor and means for releasing said locking mechanism to permit the opening of the doors.

12. In a tractor-trailer combination dirt hauling vehicle, a tractor vehicle, a trailer vehicle connected therewith and comprising a dumping body having dumping doors, cable means connected to the dumping doors for closing same and releasable to enable them to open, winding mechanism for the cable means carried by the trailer for closing the doors, a casing for said winding mechanism, a motor within said casing provided with a drive pinion, a gear on said winding mechanism, speed reduction gears between said pinion and gear and cooperating with the same for transmitting rotation from the motor to said winding mechanism for operation thereof, locking mechanism for the winding mechanism to hold same locked and thereby hold the doors closed, and instrumentalities on the tractor vehicle for controlling therefrom the operation of the motor and means for releasing said locking mechanism to permit the opening of the doors.

13. In a dumping vehicle, in combination, a dumping body having dumping doors, cable winding means operatively connected to the doors for closing the same, means for releasably locking said cable winding means, an electric motor means for operating said cable winding means to effect closing of the doors, and control means for controlling said motor means, said control means including a control circuit connected with a source of electrical energy, circuit making and breaking means in said control circuit automaticalyl operable by the tension of the cable of said cable winding means so as to automatically open said control circuit when the dumping doors have been fully closed, and to automatically close said control circuit upon relief of the cable tension when the dumping doors are opened, and manually operable circuit making and breaking means disposed in said control circuit for energizing said motor means when the automatic circuit making and breaking means aforesaid assumes its circuit closing condition 14. Apparatus as claimed in claim 13, wherein the automatically operable circuit making and breaking means includes a fixed electrical contact, a shiftable member operatively connected with a movable electrical contact, said shiftable member having a sheave mounted thereon and bodily movable therewith, and about which sheave the cable of the cable winding means is trained so that the tension in the cable is effective to control the shifting movements of said shiftable member, and means for normally yieldably urging said shiftable member in a direction to effect engagement of said electrical contacts when the tension in the cable is relieved as when the dumping doors are opened.

ALVIN C. RASMUSSEN.